US012460612B2

(12) United States Patent
Akiyama et al.

(10) Patent No.: US 12,460,612 B2
(45) Date of Patent: Nov. 4, 2025

(54) FUEL PUMP

(71) Applicant: Hitachi Astemo, Ltd., Hitachinaka (JP)

(72) Inventors: Moritsugu Akiyama, Hitachinaka (JP); Shigehiko Omata, Hitachinaka (JP); Atsushi Takaoku, Hitachinaka (JP); Satoshi Usui, Hitachinaka (JP); Minoru Hashida, Hitachinaka (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 0 days.

(21) Appl. No.: 18/281,030

(22) PCT Filed: Feb. 2, 2022

(86) PCT No.: PCT/JP2022/004023

§ 371 (c)(1),
(2) Date: Sep. 8, 2023

(87) PCT Pub. No.: WO2023/032253

PCT Pub. Date: Mar. 9, 2023

(65) Prior Publication Data

US 2024/0151198 A1 May 9, 2024

(30) Foreign Application Priority Data

Sep. 3, 2021 (JP) ................................ 2021-144175

(51) Int. Cl.
*F02M 63/00* (2006.01)
*F02M 59/46* (2006.01)

(52) U.S. Cl.
CPC .......... *F02M 63/005* (2013.01); *F02M 59/46* (2013.01); *F02M 59/464* (2013.01); *F02M 63/0036* (2013.01)

(58) Field of Classification Search
None
See application file for complete search history.

(56) References Cited

U.S. PATENT DOCUMENTS 8,202,065 B2 * 6/2012 Siegel ................ F02M 63/0036 417/440
8,430,081 B2 * 4/2013 Mancini ................ F02M 59/46 123/457

(Continued)

FOREIGN PATENT DOCUMENTS

DE 102014222873 A1 * 5/2016 ......... F16K 17/0433
DE 102020208228 A1 * 1/2021 ........... F02M 63/005

(Continued)

OTHER PUBLICATIONS

International Search Report (PCT/ISA/210) issued in PCT Application No. PCT/JP2022/004023 dated Apr. 5, 2022 with English translation (6 pages).

(Continued)

*Primary Examiner* — Kevin R Steckbauer
(74) *Attorney, Agent, or Firm* — Crowell & Moring LLP

(57) ABSTRACT

The present invention provides a fuel pump capable of preventing the occurrence of cavitation near a seat member in a valve mechanism. The fuel pump includes a plunger adapted to reciprocate, a pressurizing chamber adapted to increase and decrease its volumetric capacity through the reciprocation of the plunger, and a relief valve mechanism adapted to return a fuel to the pressurizing chamber. The relief valve mechanism includes a relief valve, and a seat member having a valve contact portion for seating the relief valve thereon. The relief valve is disposed closer to the plunger than the seat member. The seat member has an annular groove portion which forms a space communicating with the pressurizing chamber, between the annular groove portion and a second chamber (a fixing portion) surrounding the outer peripheral surface of the seat member. The space is provided at a position farther from the plunger than the valve contact portion.

9 Claims, 7 Drawing Sheets

(56) References Cited

U.S. PATENT DOCUMENTS

| | | | | |
|---|---|---|---|---|
| 10,094,346 | B1 * | 10/2018 | De Vita | F02M 55/002 |
| 10,253,741 | B2 | 4/2019 | Akiyama et al. | |
| 10,890,151 | B2 | 1/2021 | Tokumaru et al. | |
| 11,713,741 | B2 * | 8/2023 | Yagai | F02M 63/0036 123/446 |
| 11,781,513 | B2 * | 10/2023 | Tokuo | F02M 63/0077 123/445 |
| 2009/0252621 | A1 * | 10/2009 | Siegel | F04B 49/035 417/307 |
| 2010/0242922 | A1 * | 9/2010 | Mancini | F02M 59/367 417/295 |
| 2017/0321646 | A1 * | 11/2017 | Teike | F16K 17/0433 |
| 2018/0128229 | A1 | 5/2018 | Akiyama et al. | |
| 2020/0049116 | A1 | 2/2020 | Tokumaru et al. | |
| 2020/0284229 | A1 * | 9/2020 | Nemoto | F02M 59/46 |
| 2022/0252030 | A1 * | 8/2022 | Buehler | F02M 63/0225 |
| 2022/0381213 | A1 * | 12/2022 | Yagai | F02M 63/0036 |
| 2023/0029119 | A1 * | 1/2023 | Tokuo | F02M 63/007 |
| 2024/0159208 | A1 * | 5/2024 | Ito | F02M 59/466 |

FOREIGN PATENT DOCUMENTS

| | | | | | |
|---|---|---|---|---|---|
| DE | 102019212247 | A1 | * | 2/2021 | F02M 59/462 |
| EP | 2 333 304 | A1 | | 6/2011 | |
| JP | 2009-534582 | A | | 9/2009 | |
| JP | 2015-169080 | A | | 9/2015 | |
| JP | 2018-53842 | A | | 4/2018 | |
| JP | 2019-2374 | A | | 1/2019 | |
| JP | 2020-133490 | A | | 8/2020 | |
| JP | 2021-28483 | A | | 2/2021 | |
| JP | 2021028483 | A | * | 2/2021 | |
| WO | WO 2016/181755 | A1 | | 11/2016 | |
| WO | WO 2018/186219 | A1 | | 10/2018 | |
| WO | WO 2019/107101 | A1 | | 6/2019 | |
| WO | WO-2021028282 | A1 | * | 2/2021 | F02M 55/04 |

OTHER PUBLICATIONS

Japanese-language Written Opinion (PCT/ISA/237) issued in PCT Application No. PCT/JP2022/004023 dated Apr. 5, 2022 with English translation (7 pages).

Extended European Search Report issued in European Application No. 22863843.3 dated Dec. 12, 2024 (7 pages).

* cited by examiner

FUEL PUMP

TECHNICAL FIELD

The present invention relates to fuel pumps for pressurizing a fuel and supplying the fuel to an engine.

BACKGROUND ART

For example, PTL 1 describes such a fuel pump. A high-pressure fuel supply pump described in PTL 1 includes a housing, a suction valve, a discharge valve, and a relief valve. The housing includes a cylinder forming a stepped tubular-shaped space which accommodates a cylinder liner for slidably holding a plunger and which forms a pressurizing chamber. The suction valve is opened in a state where no current is supplied to an electromagnetic solenoid. If a current is supplied to the electromagnetic solenoid, the suction valve is opened to suck a fuel into the pressurizing chamber.

The discharge valve is assembled into a discharge-valve accommodating portion in the housing, and the discharge-valve accommodating portion communicates with the pressurizing chamber through a fuel discharge hole. The fuel at a high pressure which has been pressurized in the pressurizing chamber is supplied to the discharge valve. The discharge valve is opened, if the pressure of the fuel supplied thereto becomes equal to or higher than a predetermined pressure. The fuel having passed through the discharge valve is press-transferred to an accumulator.

Further, the relief valve is assembled into a relief-valve accommodating portion in the housing. The relief-valve accommodating portion communicates with a high-pressure region downstream of the discharge valve and, further, communicates with the pressurizing chamber through a communication path. If the pressure of the fuel in the high-pressure region becomes equal to or higher than a certain pressure, the relief valve is opened to return the fuel at a high pressure to the pressurizing chamber.

CITATION LIST

Patent Literature

PTL 1: WO 2018/186219 A

SUMMARY OF INVENTION

Technical Problem

On the other hand, in the high-pressure fuel supply pump described in PTL 1, the pressure in the pressurizing chamber is repeatedly raised and dropped as the plunger moves upwardly and downwardly. In such a high-pressure fuel supply pump, when the plunger descends and the pressurizing chamber is interiorly depressurized, cavitation may be generated near a relief-valve seat portion positioned at the back of the pressurizing chamber. Then, the generated cavitation is collapsed when the fuel in the pressurizing chamber is pressurized since the plunger ascends.

Such cavitation is repeatedly generated and collapsed near the relief-valve seat portion which is far from the plunger. This may induce erosion in the relief-valve seat portion, which may cause a loss of the sealing function of the relief-valve seat portion. The likelihood of occurrence of cavitation varies depending on the moving speed of the plunger. Therefore, cavitation is more likely to occur, when a larger flow rate of fuel is required or when the engine is rotated at a higher speed.

In view of the aforementioned problems, it is an object of the present invention to provide a fuel pump capable of preventing occurrence of cavitation near a seat member in a valve mechanism.

Solution to Problem

In order to solve the aforementioned problems and achieve the object of the present invention, a fuel pump according to the present invention includes a plunger adapted to reciprocate, a pressurizing chamber adapted to increase and decrease its volumetric capacity through the reciprocation of the plunger, and a relief valve mechanism adapted to return a fuel to the pressurizing chamber. The relief valve mechanism includes a relief valve, and a seat member having a valve contact portion for seating the relief valve thereon. The relief valve is disposed closer to the plunger than the seat member. The seat member has an annular groove portion which forms a space communicating with the pressurizing chamber, between this annular groove portion and a fixing portion surrounding the outer peripheral surface of the seat member. The space is provided at a position farther from the plunger than the valve contact portion.

Advantageous Effects of Invention

With the fuel pump having the aforementioned structure, it is possible to prevent the occurrence of cavitation in the vicinity of the seat member in the relief valve mechanism.

Further, problems, structures and effects other than those described above will be clarified by the following description of an embodiment.

DESCRIPTION OF EMBODIMENTS

1. Embodiment

Figure 1:
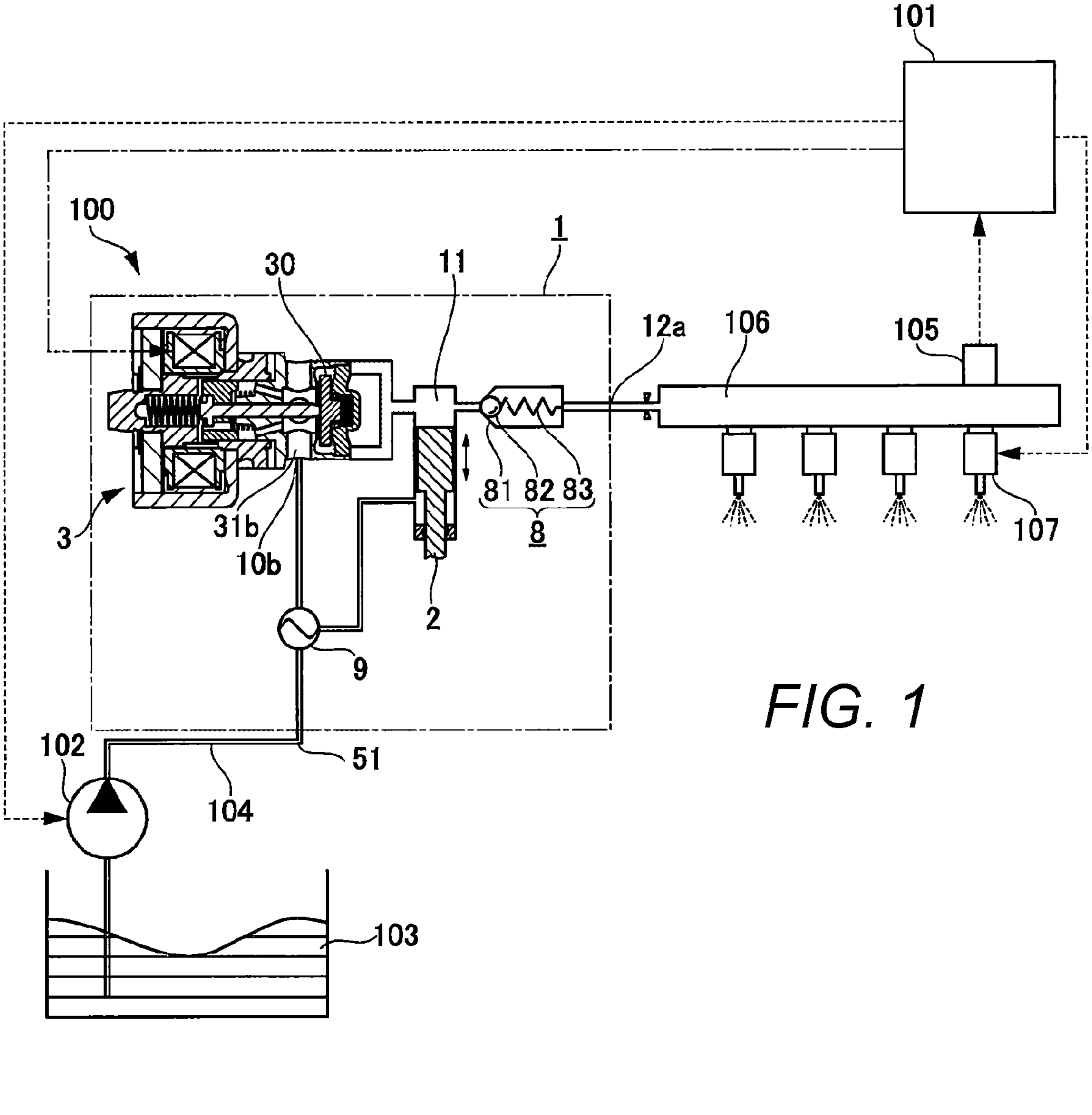
FIG. 1 is a view of the overall structure of a fuel supply system using a high-pressure fuel supply pump according to an embodiment of the present invention.

Hereinafter, a high-pressure fuel supply pump according to an embodiment of the present invention will be described. In the drawings, the same members are denoted by the same reference numerals.

[Fuel Supply System]

First, there will be described a fuel supply system using a high-pressure fuel supply pump (a fuel pump) according to the present embodiment, with reference to FIG. 1.

FIG. 1 is a view of the overall structure of the fuel supply system using the high-pressure fuel supply pump according to the present embodiment.

As illustrated in FIG. 1, the fuel supply system includes the high-pressure fuel supply pump (the fuel pump) 100, an engine control unit (ECU) 101, a fuel tank 103, a common rail 106, and a plurality of injectors 107. The components of the high-pressure fuel supply pump 100 are integrally incorporated in a pump body 1.

A fuel in the fuel tank 103 is pumped up by a feed pump 102 which is driven based on a signal from the ECU 101. The fuel having been pumped up is pressurized to an appropriate pressure by a pressure regulator, which is not illustrated. Then, the fuel is transferred to a low-pressure fuel suction port 51 in the high-pressure fuel supply pump 100 through a low-pressure pipe 104.

The high-pressure fuel supply pump 100 pressurizes the fuel supplied from the fuel tank 103 and pressure-feeds the fuel to the common rail 106. The plurality of injectors 107 and a fuel pressure sensor 105 are mounted on the common rail 106. The plurality of injectors 107 is mounted thereon in correspondence to the number of cylinders (combustion chambers), and injects the fuel according to a driving current outputted from the ECU 101. The fuel supply system according to the present embodiment is a so-called direct-injection engine system adapted to cause the injectors 107 to directly inject the fuel into the cylinder tubes in the engine.

The fuel pressure sensor 105 outputs data of a detected pressure to the ECU 101. The ECU 101 calculates an appropriate amount of fuel to be injected (a target length of injected fuel), an appropriate fuel pressure (a target fuel pressure), and the like, based on quantities of engine states (for example, a crank rotation angle, a throttle opening, an engine rotating speed, a fuel pressure, and the like) obtained from various sensors.

Further, the ECU 101 controls driving of the high-pressure fuel supply pump 100 and the plurality of injectors 107, based on the results of calculations of the fuel pressure (the target fuel pressure) and the like. Namely, the ECU 101 includes a pump control unit for controlling the high-pressure fuel supply pump 100, and an injector control unit for controlling the injector 107.

The high-pressure fuel supply pump 100 includes a pressure pulsation reduction mechanism 9, an electromagnetic suction valve mechanism 3 which is a volumetric-capacity variable mechanism, a relief valve mechanism 4 (see FIG. 2), and a discharge valve mechanism 8. The fuel flowing through the low-pressure fuel suction port 51 reaches a suction port 31*b* of the electromagnetic suction valve mechanism 3 through the pressure pulsation reduction mechanism 9 and a suction path 10*b*.

The fuel flowing into the electromagnetic suction valve mechanism 3 passes through a valve portion 32, further flows through a suction path 1*d* formed in the pump body 1, and then flows into a pressurizing chamber 11. A plunger 2 is inserted in the pressurizing chamber 11 such that the plunger 2 can reciprocate. The plunger 2 reciprocates since a motive force is transmitted thereto from a cam 91 (see FIG. 2) in the engine.

In the pressurizing chamber 11, the fuel is sucked from the electromagnetic suction valve mechanism 3 during the descending stroke of the plunger 2, while the fuel is pressurized during the ascending stroke thereof. If the pressure of the fuel in the pressurizing chamber 11 exceeds a predetermined value, the discharge valve mechanism 8 is opened, so that the high-pressure fuel is pressure-transferred to the common rail 106 through a discharge path 12*a*. Discharging of the fuel from the high-pressure fuel supply pump 100 is operated through opening and closing of the electromagnetic suction valve mechanism 3. The opening and closing of the electromagnetic suction valve mechanism 3 is controlled by the ECU 101.

[High-Pressure Fuel Supply Pump]

Next, the structure of the high-pressure fuel supply pump 100 will be described with reference to FIGS. 2 to 6.

Figure 2:
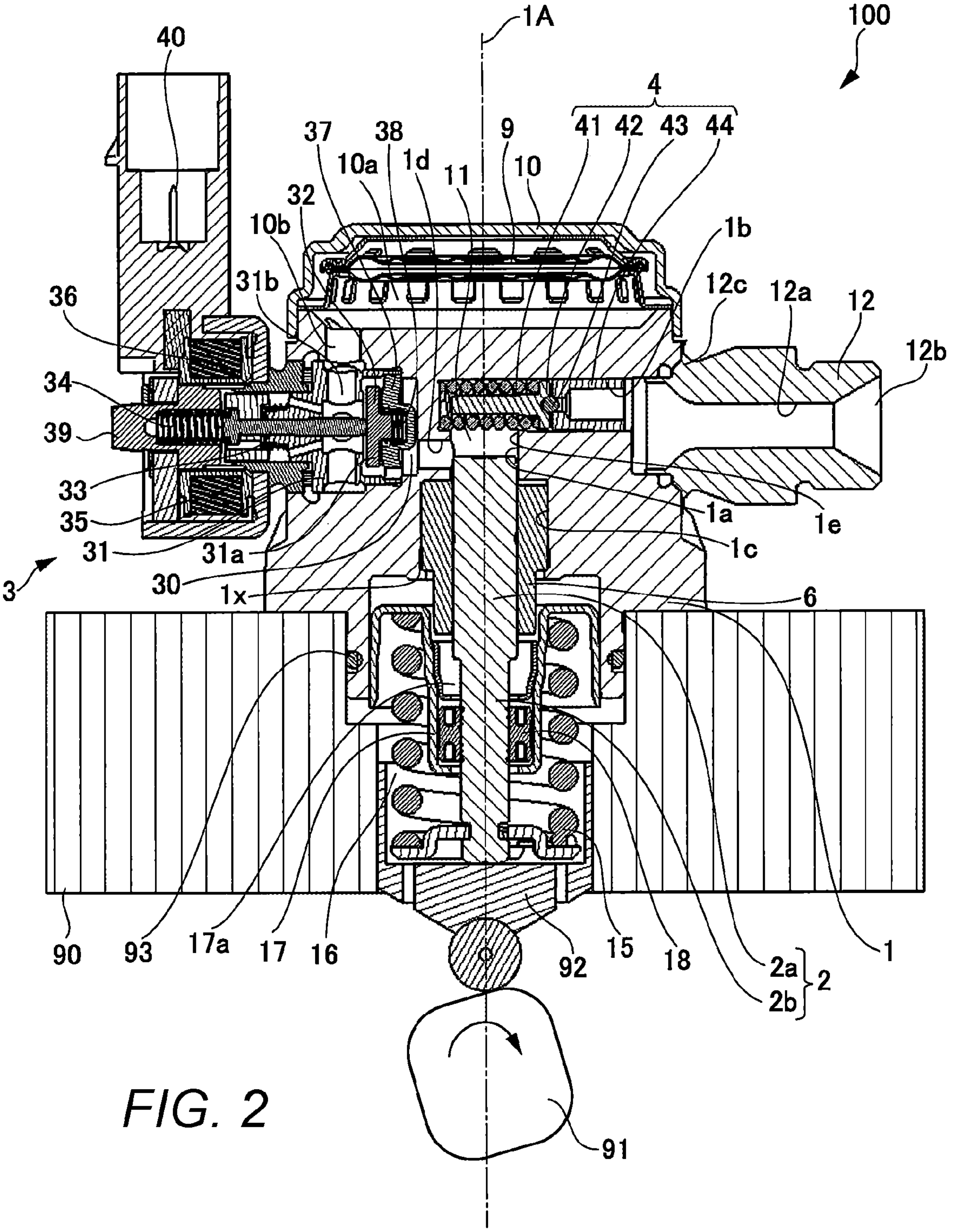
FIG. 2 is a longitudinal cross-sectional view (a part 1) of the high-pressure fuel supply pump according to an embodiment of the present invention.
Figure 3:
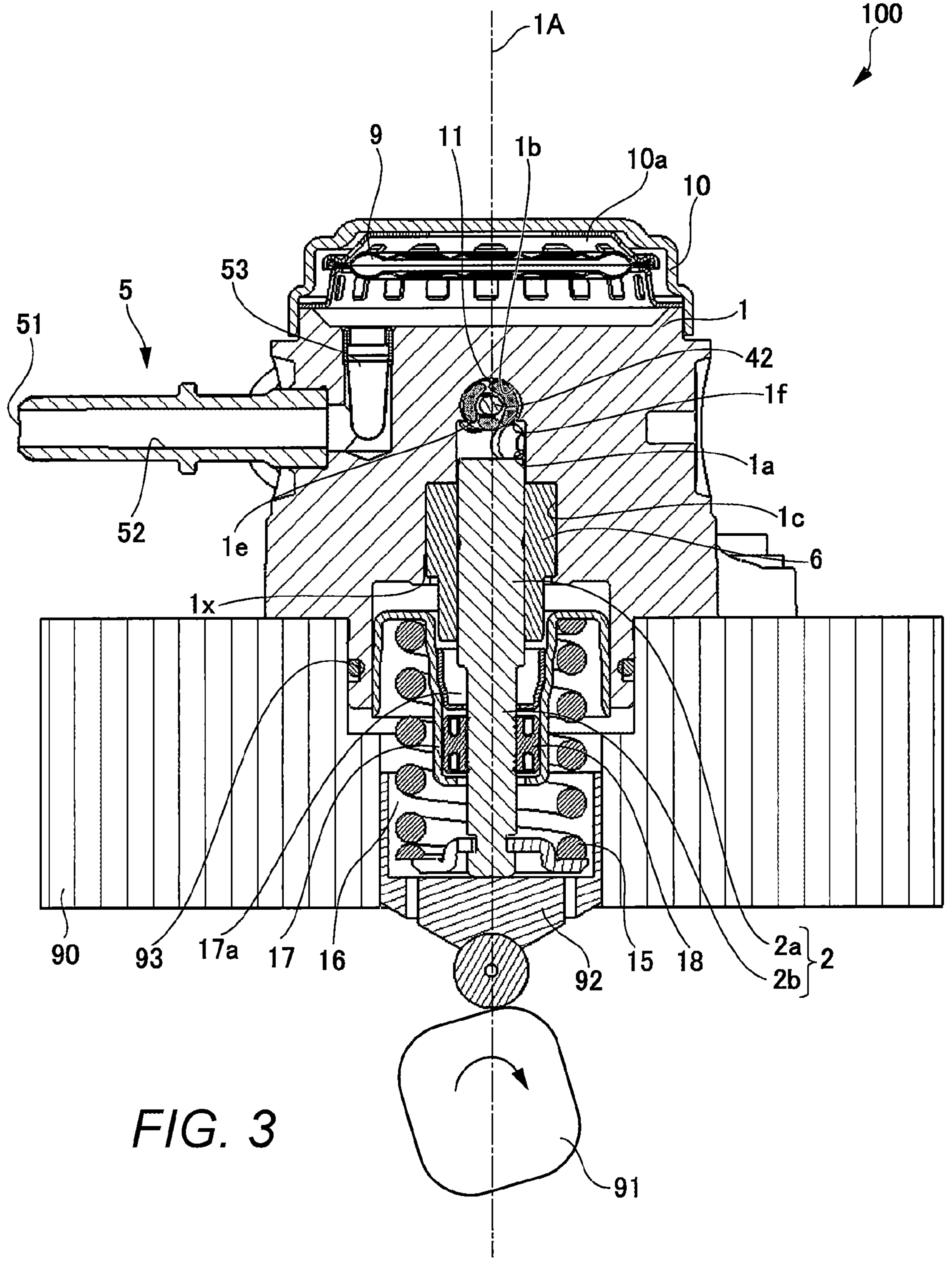
FIG. 3 is a longitudinal cross-sectional view (a part 2) of the high-pressure fuel supply pump according to an embodiment of the present invention.
Figure 4:
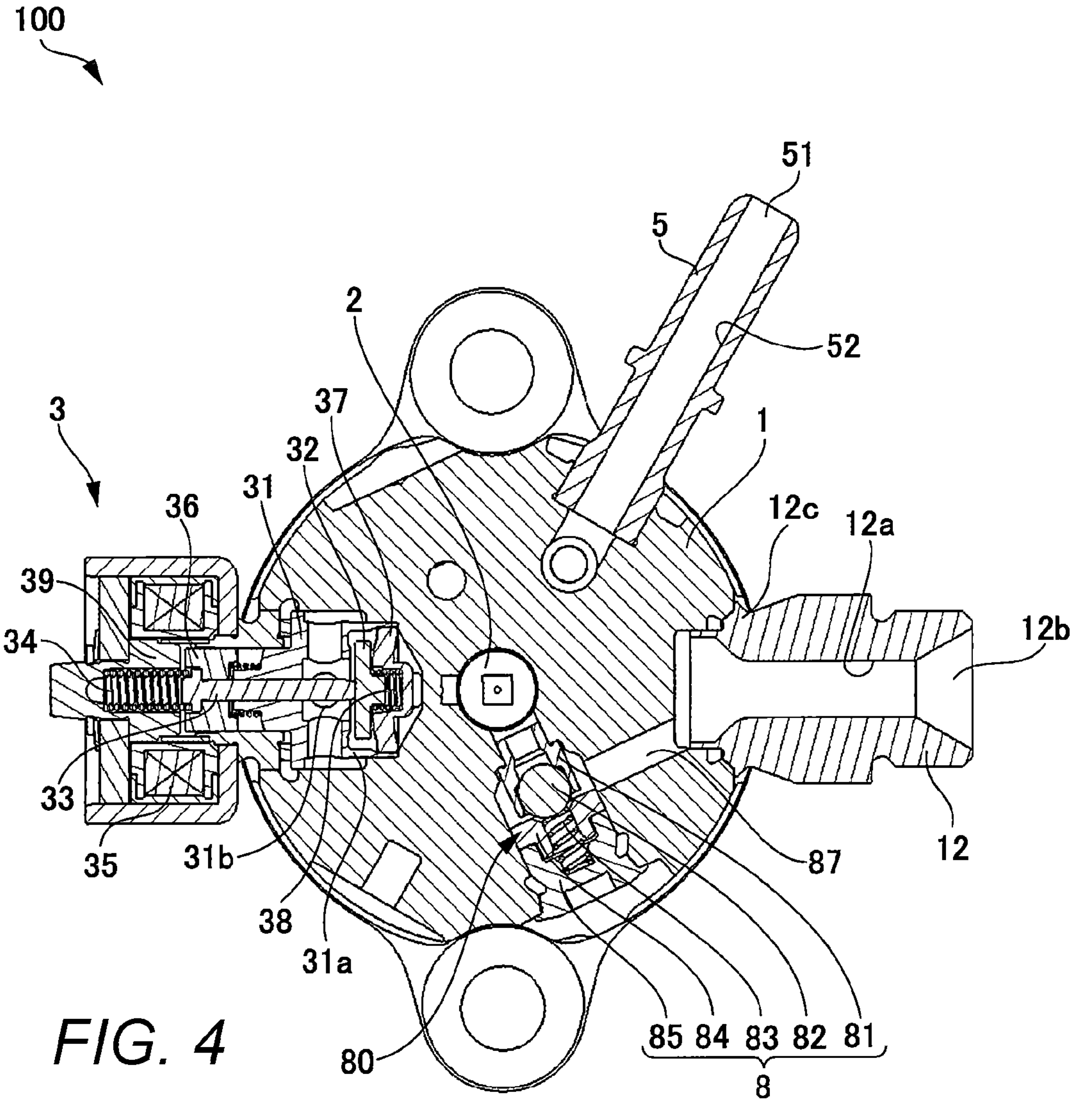
FIG. 4 is a horizontal cross-sectional view of the high-pressure fuel supply pump according to an embodiment of the present invention, when being viewed from above.
Figure 5:
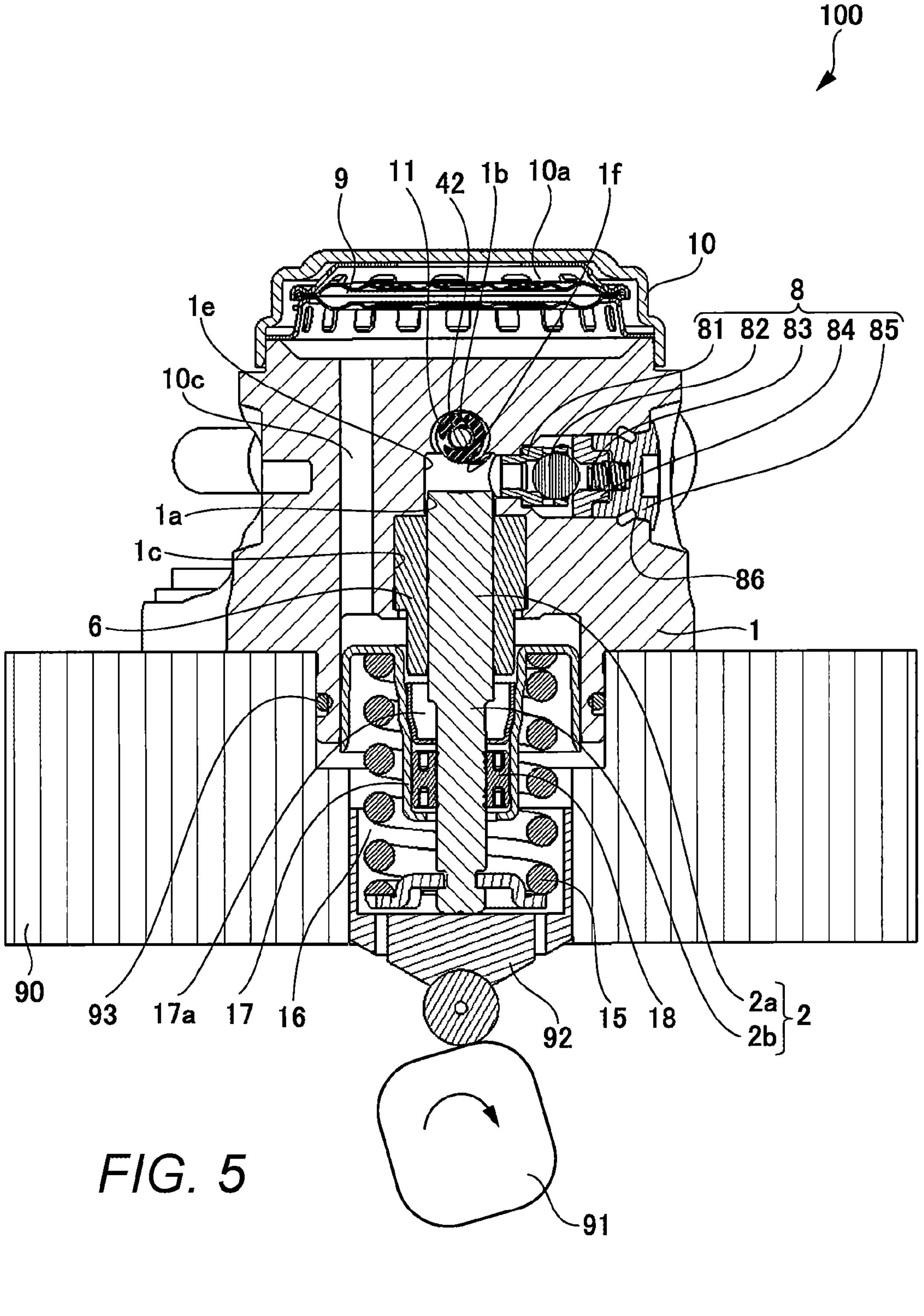
FIG. 5 is a longitudinal cross-sectional view (a part 3) of the high-pressure fuel supply pump according to an embodiment of the present invention.
Figure 6:
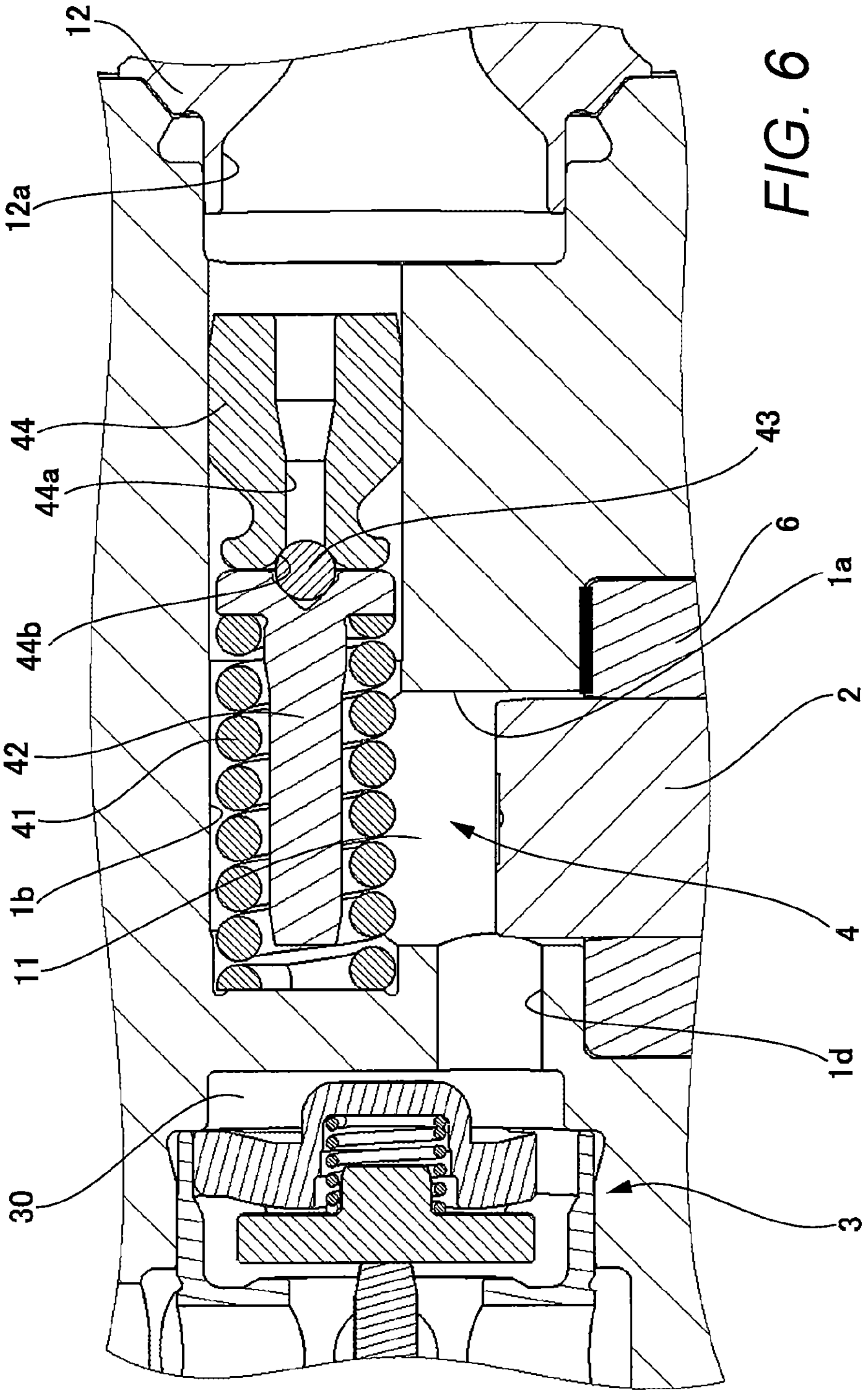
FIG. 6 is a longitudinal cross-sectional view of the periphery of a relief valve mechanism according to an embodiment of the present invention.

FIG. 2 is a longitudinal cross-sectional view (a part 1) of the high-pressure fuel supply pump 100 taken along a cross section orthogonal to the horizontal direction. FIG. 3 is a longitudinal cross-sectional view (a part 2) of the high-pressure fuel supply pump 100 taken along a cross section orthogonal to the horizontal direction. FIG. 4 is a cross-sectional view of the high-pressure fuel supply pump 100 taken along a cross section orthogonal to the vertical direction. FIG. 5 is a longitudinal cross-sectional view (a part 3) of the high-pressure fuel supply pump 100 taken along a cross section orthogonal to the horizontal direction. FIG. 6 is an explanatory view illustrating the relief valve mechanism 4 in an enlarging manner.

As illustrated in FIG. 2, the pump body 1 in the high-pressure fuel supply pump 100 is formed to have a substantially columnar shape. As illustrated in FIGS. 2 and 3, the pump body 1 is interiorly provided with a first chamber 1*a*, a second chamber 1*b*, a third chamber 1*c*, and the suction path 1*d*. The pump body 1 is in intimate contact with a fuel pump mounting portion 90 and is secured by a plurality of bolts (screws), which is not illustrated.

The first chamber 1*a* is a columnar space portion provided in the pump body 1, and the first chamber 1*a* has a center line LA coincident with the center line of the pump body 1. The plunger 2 is inserted at its one end portion in the first chamber 1*a*, and the plunger 2 reciprocates within the first chamber 1*a*. The first chamber 1*a* and the one end of the plunger 2 form the pressurizing chamber 11.

The second chamber 1*b* is a columnar space portion provided in the pump body 1, and the second chamber 1*b* has a center line orthogonal to the center line of the pump body 1 (the first chamber 1*a*). In the second chamber 1*b*, there is formed a relief valve chamber for disposing the relief valve mechanism 4 therein. The diameter of the second chamber 1*b* (the relief valve chamber) is smaller than the diameter of the first chamber 1*a*. The first chamber 1*a* and the second chamber 1*b* communicate with each other through a circular communication hole 1*e*. The fuel having passed through the relief valve mechanism 4 passes through the communication hole 1*e* and returns to the pressurizing chamber 11.

The third chamber 1*c* is a columnar space portion provided in the pump body 1 and is continuous with the other end of the first chamber 1*a*. The third chamber 1*c* has a center line coincident with the center line 1A of the first chamber 1*a* and the center line of the pump body 1. The diameter of the third chamber 1*c* is larger than the diameter of the first chamber 1*a*. In the third chamber 1*c*, there is disposed a cylinder 6 for guiding the reciprocation of the plunger 2. This can bring an end surface of the cylinder 6 into contact with a step portion (a flat-surface portion) between the first chamber 1*a* and the third chamber 1*c*, which can prevent the cylinder 6 from being displaced toward the first chamber 1*a*.

The cylinder 6 is formed to have a tubular shape, and is press-fitted at its outer periphery into the third chamber 1*c* in the pump body 1. Further, the cylinder 6 is in contact with the top surface of the third chamber 1*c* (the step portion between the first chamber 1*a* and the third chamber 1*c*), at its one end. The plunger 2 is slidably in contact with the inner peripheral surface of the cylinder 6.

The pump body 1 is provided with a fixing portion 1*x* which engages with a substantially center portion of the cylinder 6 in the axial direction. The fixing portion 1*x* is formed to be plastically deformable. The fixing portion 1*x* presses the cylinder 6 upwardly (upwardly in FIG. 2).

An O-ring 93 as a specific example of a seat member is interposed between the fuel pump mounting portion 90 and the pump body 1. The O-ring 93 prevents an engine oil from leaking to the outside of the engine (the internal combustion engine) through between the fuel pump mounting portion 90 and the pump body 1.

A tappet 92 is provided on the lower end of the plunger 2. The tappet 92 converts rotational motion of the cam 91 attached to a cam shaft in the engine into upward and downward motions and transmits the upward and downward motions to the plunger 2. The plunger 2 is biased toward the cam 91 by a spring 16 through a retainer 15, and is press-bonded to the tappet 92. The tappet 92 reciprocates along with the rotation of the cam 91. The plunger 2 reciprocates together with the tappet 92, thereby changing the volumetric capacity of the pressurizing chamber 11.

A seal holder 17 is disposed between the cylinder 6 and the retainer 15. The seal holder 17 is formed to have such a tubular shape as to insert the plunger 2 therethrough. The seal holder 17 has an auxiliary chamber 17*a* at its upper end portion closer to the cylinder 6. Further, the seal holder 17 holds a plunger seal 18 at its lower end portion closer to the retainer 15.

The plunger seal 18 is slidably in contact with the outer periphery of the plunger 2. When the plunger 2 reciprocates, the plunger seal 18 seals the fuel in the auxiliary chamber 17*a*, in order to prevent the fuel in the auxiliary chamber 17*a* from flowing into the engine. Further, the plunger seal 18 prevents a lubricating oil (including an engine oil) for lubricating sliding portions in the engine from flowing into the pump body 1.

In FIG. 2, the plunger 2 reciprocates in the upward and downward directions. If the plunger 2 descends, the volumetric capacity of the pressurizing chamber 11 increases. If the plunger 2 ascends, the volumetric capacity of the pressurizing chamber 11 decreases.

Namely, the plunger 2 is disposed in such a way as to reciprocate in such a direction as to increase and decrease the volumetric capacity of the pressurizing chamber 11.

The plunger 2 has a large diameter portion 2*a* and a small diameter portion 2*b*. When the plunger 2 reciprocates, the large diameter portion 2*a* and the small diameter portion 2*b* are positioned in the auxiliary chamber 17*a*. Therefore, the volumetric capacity of the auxiliary chamber 17*a* is increased and decreased by the reciprocation of the plunger 2.

The auxiliary chamber 17*a* communicates with a low-pressure fuel chamber 10 through a fuel path 10*c* (see FIG. 5). When the plunger 2 descends, the fuel flows from the auxiliary chamber 17*a* to the low-pressure fuel chamber 10. When the plunger 2 ascends, the fuel flows from the low-pressure fuel chamber 10 to the auxiliary chamber 17*a*. This can reduce the amount of the fuel flowing to the inside and outside of the pump during the suction stroke or the return stroke of the high-pressure fuel supply pump 100, thereby reducing pressure pulsations generated in the high-pressure fuel supply pump 100.

As illustrated in FIG. 3, there is provided the low-pressure fuel chamber 10, on the upper portion of the pump body 1 in the high-pressure fuel supply pump 100. A suction joint 5 communicating with the low-pressure fuel chamber 10 is attached to a side surface portion of the pump body 1. The suction joint 5 is connected to the low-pressure pipe 104 for passing, therethrough, the fuel supplied from the fuel tank 103 (see FIG. 1). The fuel in the fuel tank 103 is supplied to the inside of the pump body 1 through the suction joint 5.

The suction joint 5 includes a low-pressure fuel suction port 51 connected to the low-pressure pipe 104, and a suction flow path 52 communicating with the low-pressure fuel suction port 51. The fuel having passed through the suction flow path 52 passes through a suction filter 53 provided inside the pump body 1 and, then, is supplied to the low-pressure fuel chamber 10. The suction filter 53 removes foreign substances existing in the fuel, thereby preventing such foreign substances from entering the high-pressure fuel supply pump 100.

The low-pressure fuel chamber 10 is provided with a low-pressure fuel flow path 10*a* and a suction path 10*b* (see FIG. 2). The pressure pulsation reduction mechanism 9 is provided in the low-pressure fuel flow path 10*a*. If the fuel flowed into the pressurizing chamber 11 is returned, again, to the suction path 10*b* through the electromagnetic suction valve mechanism 3 being in a valve opening state, this induces a pressure pulsation in the low-pressure fuel chamber 10. The pressure pulsation reduction mechanism 9 reduces spreading of the pressure pulsation induced in the high-pressure fuel supply pump 100 to the low-pressure pipe 104.

The pressure pulsation reduction mechanism 9 is formed from a metal diaphragm damper constituted by two disk-shaped corrugated metal plates bonded to each other at their outer peripheries, and an inert gas such as argon which is introduced in the inside thereof. The metal diaphragm damper in the pressure pulsation reduction mechanism 9 expands and contracts to absorb or reduce pressure pulsations.

The suction path 10*b* communicates with the suction port 31*b* (see FIG. 2) in the electromagnetic suction valve mechanism 3. The fuel having passed through the low-pressure fuel flow path 10*a* reaches the suction port 31*b* in the electromagnetic suction valve mechanism 3 through the suction path 10*b*.

As illustrated in FIGS. 2 and 4, the electromagnetic suction valve mechanism 3 is inserted in a suction valve chamber 30 formed in the pump body 1. The suction valve chamber 30 is provided upstream of the pressurizing chamber 11 (closer to the suction path 10*b*), and is formed to be a lateral hole extending in the horizontal direction. The electromagnetic suction valve mechanism 3 includes a suction valve seat 31 press-fitted in the suction valve chamber 30, the valve portion 32, a rod 33, a rod biasing spring 34, an electromagnetic coil 35, and an anchor 36.

The suction valve seat 31 is formed to have a tubular shape, and is provided with a seating portion 31*a* on its inner peripheral portion. Further, the suction valve seat 31 is provided with the suction port 31*b* which extends from its outer peripheral portion to its inner peripheral portion. The suction port 31*b* communicates with the suction path 10*b* in the aforementioned low-pressure fuel chamber 10.

In the suction valve chamber 30, there is disposed a stopper 37 facing the seating portion 31*a* in the suction valve seat 31. The valve portion 32 is disposed between the stopper 37 and the seating portion 31*a*. Further, a valve biasing spring 38 is interposed between the stopper 37 and the valve portion 32. The valve biasing spring 38 biases the valve portion 32 toward the seating portion 31*a*.

The valve portion 32 closes the communicating portion between the suction port 31*b* and the pressurizing chamber 11 by coming into contact with the seating portion 31*a*. When the valve portion 32 closes the communicating portion between the suction port 31*b* and the pressurizing chamber 11, the electromagnetic suction valve mechanism 3 is in a valve closing state. On the other hand, the valve portion 32 opens the communicating portion between the suction port 31*b* and the pressurizing chamber 11 by coming into contact with the stopper 37. When the valve portion 32 opens the communicating portion between the suction port 31*b* and the pressurizing chamber 11, the electromagnetic suction valve mechanism 3 is in a valve opening state.

The rod 33 penetrates a tubular hole in the suction valve seat 31, and is in contact with the valve portion 32 at its one end. The rod biasing spring 34 biases the valve portion 32 through the rod 33 in the valve opening direction, which is toward the stopper 37. The rod biasing spring 34 is engaged at its one end with the other end of the rod 33. The rod biasing spring 34 is engaged at its other end with a magnetic core 39 disposed in such a way as to surround the rod biasing spring 34.

The anchor 36 faces an end face of the magnetic core 39. Further, the anchor 36 is engaged with a flange provided at an intermediate portion of the rod 33. The electromagnetic coil 35 is disposed in such a way as to go around the magnetic core 39. A terminal member 40 is electrically connected to the electromagnetic coil 35, and a current is flowed through the electromagnetic coil 35 via the terminal member 40.

In a non-energized state where no current flows through the electromagnetic coil 35, the rod 33 is biased in the valve opening direction by the biasing force of the rod biasing spring 34. This causes the rod 33 to press the valve portion 32 in the valve opening direction. As a result, the valve portion 32 is separated from the seating portion 31*a* and abuts on the stopper 37, which brings the electromagnetic suction valve mechanism 3 into the valve opening state. Namely, the electromagnetic suction valve mechanism 3 is of a normally-open type which is opened in a non-energized state.

When the electromagnetic suction valve mechanism 3 is in the valve opening state, the fuel in the suction port 31*b* passes between the valve portion 32 and the seating portion 31*a*, and flows into the pressurizing chamber 11 through a plurality of fuel passing holes (not illustrated) in the stopper 37 and through the suction path 1*d*. When the electromagnetic suction valve mechanism 3 is in the valve opening state, the valve portion 32 is in contact with the stopper 37, which restricts the position of the valve portion 32 in the valve opening direction. When the electromagnetic suction valve mechanism 3 is in the valve opening state, the gap existing between the valve portion 32 and the seating portion 31*a* is a range within which the valve portion 32 is movable, which is a valve opening stroke.

If a current flows through the electromagnetic coil 35, the anchor 36 is attracted in the valve closing direction by a magnetic attraction force of the magnetic core 39. As a result, the anchor 36 moves against the biasing force of the rod biasing spring 34 and comes into contact with the magnetic core 39. When the anchor 36 moves in the valve closing direction, namely toward the magnetic core 39, the rod 33 with which the anchor 36 engages moves together with the anchor 36. As a result, the valve portion 32 is released from the biasing force in the valve opening direction, and is moved in the valve closing direction by the biasing force of the valve biasing spring 38. Further, if the valve portion 32 comes into contact with the seating portion 31*a* in the suction valve seat 31, the electromagnetic suction valve mechanism 3 comes into a valve closing state.

As illustrated in FIGS. 4 and 5, the discharge valve mechanism 8 is disposed in a discharge valve chamber 80 provided near the outlet (downstream) of the pressurizing chamber 11. The discharge valve mechanism 8 includes a discharge valve seat 81 communicating with the pressurizing chamber 11, a valve portion 82 which comes into contact with and separates from the discharge valve seat 81, a discharge valve spring 83 for biasing the valve portion 82 toward the discharge valve seat 81, and a discharge valve stopper 84 which determines a stroke (movement distance) of the valve portion 82.

Further, the discharge valve mechanism 8 includes a plug 85 for blocking leakage of the fuel to the outside. The discharge valve stopper 84 is press-fitted in the plug 85. The plug 85 is bonded to the pump body 1 by welding at a welded portion 86. The discharge valve chamber 80 is opened and closed by the valve portion 82. The discharge valve chamber 80 communicates with a discharge valve chamber path 87. The discharge valve chamber path 87 is formed in the pump body 1.

The pump body 1 is provided with a lateral hole communicating with the second chamber 1*b* (the relief valve chamber) illustrated in FIG. 2, and a discharge joint 12 is inserted in this lateral hole. The discharge joint 12 includes the aforementioned discharge path 12*a* communicating with the lateral hole in the pump body 1 and with the discharge valve chamber path 87, and a fuel discharge port 12*b* forming one end of the discharge path 12*a*. The fuel discharge port 12*b* in the discharge joint 12 communicates with the common rail 106. The discharge joint 12 is secured to the pump body 1 by welding at a welded portion 12*c*.

In a state where there is no difference in fuel pressure (fuel differential pressure) between the pressurizing chamber 11 and the discharge valve chamber 80 (the discharge valve chamber path 87), the valve portion 82 is pressed against and contacted with the discharge valve seat 81 by the biasing force of the discharge valve spring 83, which brings the discharge valve mechanism 8 into a valve closing state. If the fuel pressure in the pressurizing chamber 11 becomes larger than the fuel pressure in the discharge valve chamber 80 (the discharge valve chamber path 87), the valve portion 82 moves against the biasing force of the discharge valve spring 83, which brings the discharge valve mechanism 8 into a valve opening state.

When the discharge valve mechanism 8 has come into the valve opening state, the fuel (at a high pressure) in the pressurizing chamber 11 passes through the discharge valve mechanism 8 and reaches the discharge valve chamber 80 (the discharge valve chamber path 87). Then, the fuel having reached the discharge valve chamber path 87 is discharged to the common rail 106 (see FIG. 1) through the fuel discharge port 12*b* of the discharge joint 12. With the aforementioned structure, the discharge valve mechanism 8 functions as a check valve for restricting the direction of flow of the fuel.

The relief valve mechanism 4 illustrated in FIGS. 2 and 6 is a valve structured as follows. Namely, in the event of some problems in the common rail 106 or a member ahead thereof, if the pressure in the common rail 106 is raised to exceed a predetermined pressure, the relief valve mechanism 4 operates to return the fuel in the discharge path 12*a* to the pressurizing chamber 11. The discharge path 12*a* communicates with the discharge valve chamber 80 through the discharge valve chamber path 87. Therefore, the pressure in the discharge path 12*a* is equal to the pressure in the discharge valve chamber 80.

The relief valve mechanism 4 comes into a valve opening state, if the difference between the pressure in the discharge valve chamber 80 (the discharge valve chamber path 87) and the pressure in the second chamber 1*b* (the relief valve chamber) exceeds a set value.

The relief valve mechanism 4 includes a relief spring 41, a relief valve holder 42, a relief valve 43, and a seat member 44. The relief valve mechanism 4 is disposed in the second chamber 1*b* (the relief valve chamber) by being inserted thereinto through the discharge joint 12.

The relief spring 41, which is a coil-shaped spring, is in contact at its one end with the pump body 1 (with one end of the second chamber 1*b*). Further, the relief spring 41 is in contact at its other end with the relief valve holder 42. The relief valve holder 42 is engaged with the relief valve 43. The relief spring 41 is compressed to bias the relief valve holder 42 and the relief valve 43 toward the seat member 44.

The seat member 44 is press-fitted in the second chamber 1*b* (the relief valve chamber). The seat member 44 has a fuel path 44*a* facing the relief valve 43. The fuel path 44*a* communicates with the discharge path 12*a* at its opposite side from the relief valve 43. The relief valve 43 comes into contact with the seat member 44, by being pressed by the biasing force of the relief spring 41. This causes the relief valve 43 to close the fuel path 44*a* in the seat member 44. Movement of the fuel between the pressurizing chamber 11 (upstream side) and the seat member 44 (downstream side) is blocked by the relief valve 43 being in contact (intimate contact) with the seat member 44 and closing the fuel path 44*a*.

If the pressure in the discharge valve chamber 80 (the discharge valve chamber path 87), the common rail 106 and a member ahead thereof is raised, the difference thereof from the pressure in the second chamber 1*b* (the relief valve chamber) exceeds the set value. As a result, the fuel near the seat member 44 presses the relief valve 43, and moves the relief valve 43 against the biasing force of the relief spring 41. As a result, the relief valve 43 is opened, which causes the fuel in the discharge path 12*a* to return to the pressurizing chamber 11 through the fuel path 44*a* in the seat member 44. Therefore, the biasing force of the relief spring 41 determines the pressure which causes the relief valve 43 to open.

[Operations of High-Pressure Fuel Supply Pump]

Next, there will be described operations of the high-pressure fuel pump according to the present embodiment, with reference to FIGS. 2 and 4.

Referring to FIG. 2, when the plunger 2 descends, if the electromagnetic suction valve mechanism 3 is opened, the fuel flows into the pressurizing chamber 11 through the suction path 1*d*. Hereinafter, the stroke of descending of the plunger 2 will be referred to as a suction stroke. On the other hand, when the plunger 2 ascends, if the electromagnetic suction valve mechanism 3 is closed, the fuel in the pressurizing chamber 11 is pressurized, and passes through the discharge valve mechanism 8 (see FIG. 4), and is press-fed to the common rail 106 (see FIG. 1). Hereinafter, the stroke of ascending of the plunger 2 will be referred to as an ascending stroke.

As described above, if the electromagnetic suction valve mechanism 3 is closed during the ascending stroke, the fuel sucked into the pressurizing chamber 11 during the suction stroke is pressurized and is discharged to the common rail 106. On the other hand, if the electromagnetic suction valve mechanism 3 is opened during the ascending stroke, the fuel in the pressurizing chamber 11 is pushed back into the suction path 1*d* and is not discharged to the common rail 106. As described above, discharging of the fuel from the high-pressure fuel supply pump 100 is operated through opening and closing of the electromagnetic suction valve mechanism 3. The opening and closing of the electromagnetic suction valve mechanism 3 is controlled by the ECU 101.

During the suction stroke, the volumetric capacity of the pressurizing chamber 11 increases, which decreases the fuel pressure in the pressurizing chamber 11. This decreases the fluid differential pressure (which will be referred to as a "fluid differential pressure between before and after the valve portion 32" hereinafter) between the suction port 31*b* and the pressurizing chamber 11. Further, if the biasing force of the rod biasing spring 34 becomes larger than the fluid differential pressure between before and after the valve portion 32, the rod 33 moves in the valve opening direction, and the valve portion 32 is separated from the seating portion 31*a* of the suction valve seat 31, which brings the electromagnetic suction valve mechanism 3 into the valve opening state.

When the electromagnetic suction valve mechanism 3 has come into the valve opening state, the fuel in the suction port 31*b* passes between the valve portion 32 and the seating portion 31*a*, further passes through the plurality of fuel passing holes (not illustrated) in the stopper 37, and flows into the pressurizing chamber 11 through the suction path 1*d*. When the electromagnetic suction valve mechanism 3 is in the valve opening state, the valve portion 32 is in contact with the stopper 37, which restricts the position of the valve portion 32 in the valve opening direction. When the electromagnetic suction valve mechanism 3 is in the valve opening state, the gap existing between the valve portion 32 and the seating portion 31*a* is a range within which the valve portion 32 is movable, which is a valve opening stroke.

After the completion of the suction stroke, the ascending stroke is started. At this time, the electromagnetic coil 35 remains in a non-energized state, and no magnetic attraction force acts between the anchor 36 and the magnetic core 39. Further, the valve portion 32 undergoes a biasing force in the valve opening direction, which corresponds to the difference in biasing force between the rod biasing spring 34 and the valve biasing spring 38. The valve portion 32 also undergoes a pressing force in the valve closing direction due to a fluid force generated by the fuel flowing back from the pressurizing chamber 11 to the low-pressure fuel flow path 10*a*.

In this state, in order to maintain the electromagnetic suction valve mechanism 3 at the valve opening state, the difference in biasing force between the rod biasing spring 34 and the valve biasing spring 38 is set to be larger than the fluid force. The volumetric capacity of the pressurizing chamber 11 decreases as the plunger 2 ascends. Therefore, the fuel having been sucked into the pressurizing chamber 11 passes, again, between the valve portion 32 and the seating portion 31*a* and is returned to the suction port 31*b*, and the pressure inside the pressurizing chamber 11 is not raised. This stroke is referred to as a return stroke.

During the return stroke, if a control signal from the ECU 101 (see FIG. 1) is applied to the electromagnetic suction valve mechanism 3, a current flows through the electromagnetic coil 35 via the terminal member 40. If a current flows through the electromagnetic coil 35, a magnetic attractive force acts between the magnetic core 39 and the anchor 36, which causes the anchor 36 (the rod 33) to be attracted to the magnetic core 39. As a result, the anchor 36 (the rod 33) moves in the valve closing direction (in the direction away from the valve portion 32), against the biasing force of the rod biasing spring 34.

If the anchor 36 (the rod 33) moves in the valve closing direction, the valve portion 32 is released from the biasing force in the valve opening direction, and moves in the valve closing direction due to the biasing force of the valve biasing spring 38 and the fluid force caused by the fuel flowing into the suction path 10*b*. Further, if the valve portion 32 comes into contact with the seating portion 31*a* in the suction valve seat 31 (the valve portion 32 is seated on the seating portion 31*a*), the electromagnetic suction valve mechanism 3 is brought into a valve closing state.

After the electromagnetic suction valve mechanism 3 has come into the valve closing state, the fuel in the pressurizing chamber 11 is pressurized along with the ascending of the plunger 2. If the pressure of the fuel in the pressurizing chamber 11 becomes equal to or higher than a predetermined pressure, the fuel passes through the discharge valve mechanism 8 and is discharged to the common rail 106 (see FIG. 1). This stroke is referred to as a discharge stroke. Namely, the ascending stroke from the lower start point to the upper start point of the plunger 2 is constituted by the return stroke and the discharge stroke. By controlling the timing of energizing the electromagnetic coil 35 in the electromagnetic suction valve mechanism 3, it is possible to control the amount of high-pressure fuel to be discharged.

If the timing of energizing the electromagnetic coil 35 is made earlier, this decreases the proportion of the return stroke during the ascending stroke, while increasing the proportion of the discharge stroke. This decreases the amount of the fuel returned to the suction path 10*b*, while increasing the amount of the fuel discharged at a high pressure. On the other hand, if the timing of energizing the electromagnetic coil 35 is made later, this increases the proportion of the return stroke during the ascending stroke, while decreasing the proportion of the discharge stroke. This increases the amount of the fuel returned to the suction path 10*b*, while decreasing the amount of the fuel discharged at a high pressure. By controlling the timing of energizing the electromagnetic coil 35 as described above, it is possible to control the amount of the fuel discharged at a high pressure to an amount required for the engine (the internal combustion engine).

[Seat Member in Relief Valve Mechanism]

Next, the seat member 44 in the relief valve mechanism 4 according to the present embodiment will be described with reference to FIGS. 6 and 7.

Figure 7:
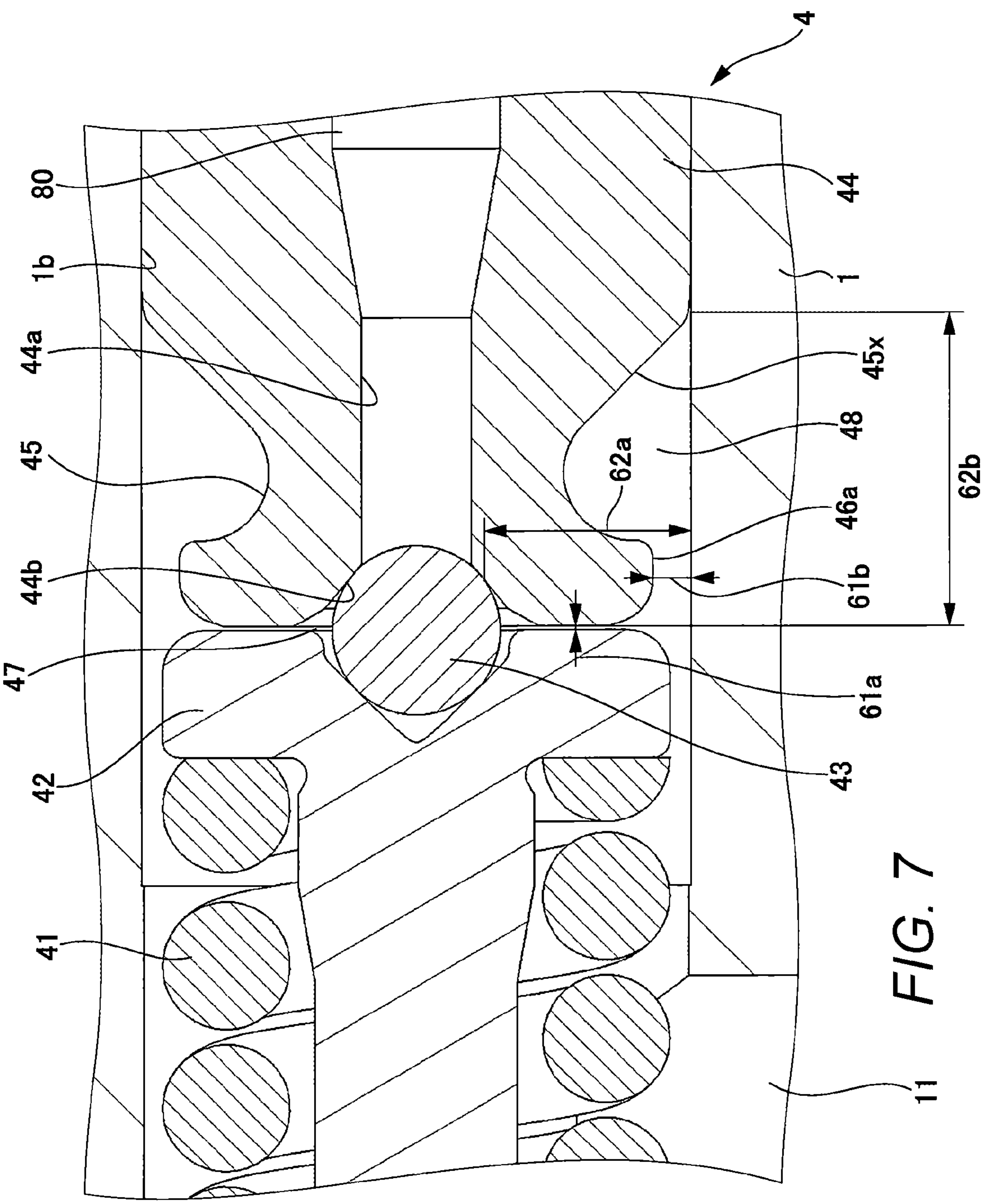
FIG. 7 is an explanatory view illustrating a position where cavitation occurs around the relief valve mechanism according to an embodiment of the present invention.

FIG. 7 is an explanatory view illustrating a position where a cavitation occurs around the relief valve mechanism 4.

As described above, the relief valve 43 is pressed against the seat member 44 by the spring force of the relief spring 41. The seat member 44 includes a valve contact portion 44*b* with which the relief valve 43 comes into contact (seats). The relief valve mechanism 4 has a sealing function, since the relief valve 43 and the valve contact portion 44*b* of the seat member 44 come into intimate contact with each other. Therefore, if the relief valve 43 and the valve contact portion 44*b* of the seat member 44 come into intimate contact with each other, this provides liquid-tight sealing between the pressurizing chamber 11 including the second chamber 1*b* and the discharge path 12*a*.

Since the relief valve mechanism 4 has the sealing function, it is possible to pressurize the fuel in the pressurizing chamber 11 when the plunger 2 (see FIG. 6) ascends. Further, since the relief valve mechanism 4 has the sealing function, it is possible to maintain the pressure of the fuel in the discharge valve chamber 80 and, therefore, the pressure of the fuel in the common rail 106, even after the operation of the plunger 2 has been stopped. Therefore, in order to maintain the pressure of the fuel in the common rail 106, the sealing function of the valve contact portion 44*b* is important.

On the other hand, it is assumed that the valve contact portion 44*b* of the seat member 44 is disposed at a deepest portion farthest from the plunger 2, in the pressurizing chamber 11. In this case, when the plunger 2 descends and the fuel in the pressurizing chamber 11 is depressurized, cavitation occurs in a space 47 near the valve contact portion 44*b*. Then, when the plunger 2 ascends and the fuel in the pressurizing chamber 11 is pressurized, the cavitation collapses.

If cavitation repeatedly occurs and collapses near the valve contact portion 44*b* in the space 47, erosion occurs radially across the ring-shaped valve contact portion 44*b*. This may result in a loss of the sealing function of the valve contact portion 44*b*. The likelihood of occurrence of cavitation varies depending on the moving speed of the plunger 2. Therefore, cavitation is more likely to occur, when a larger flow rate of fuel is required or when the engine (the internal combustion engine) is rotated at a higher speed.

As illustrated in FIG. 7, an annular groove portion 45 is provided in an outer peripheral surface of one end portion of the seat member 44. By providing the annular groove portion 45, a substantially circular flange portion 46 is formed at the one end portion of the seat member 44.

The flange portion 46 faces the relief valve holder 42. The diameter of the flange portion 46 is smaller than the diameter of the second chamber 1*b*. The valve contact portion 44*b* continuous with the fuel path 44*a* is provided at a central portion of the flange portion 46. The valve contact portion 44*b* is formed to be a ring-shaped tapered portion continuous with the fuel path 44*a*. By providing the flange portion 46, it is possible to reduce the volumetric capacity of the pressurizing chamber 11, even though the annular groove portion 45 is provided. This can suppress the decrease of the discharging efficiency.

The space 47 surrounded by the relief valve holder 42, the relief valve 43, and the flange portion 46 is formed in the vicinity of the valve contact portion 44*b* of the flange portion 46. A space 48 is formed between the annular groove portion 45 and the second chamber 1*b*. The annular groove portion 45 and the space 48 are provided at positions farther from the plunger 2 than the valve contact portion 44*b*.

Descending of the plunger 2 depressurizes the fuel in the pressurizing chamber 11. The depressurization of the fuel starts from the deepest portion farthest from the plunger 2 in the pressurizing chamber 11. Namely, the fuel in the pressurizing chamber 11 is pulled from the deepest portion during the depressurization. Therefore, cavitation can be preferentially generated in the space 48. This can prevent the occurrence of cavitation in the space 47 near the valve contact portion 44*b*.

A gap 61*a* is formed between the flange portion 46 and the relief valve holder 42. The area of the peripheral surface of the gap 61*a* which faces the second chamber 1*b* is the area of an opening which communicates the space 47 generated near the valve contact portion 44*b* with the plunger 2 side of the pressurizing chamber 11. Hereinafter, the area of the peripheral surface of the gap 61*a* will be referred to as an "opening area of the gap 61*a*".

A gap 61*b* is formed between the outer peripheral surface 46*a* of the flange portion 46 and the inner peripheral surface of the second chamber 1*b*. The area of a plane in the gap 61*b* which is orthogonal to the center line of the second chamber 1*b* is the area of an opening which communicates the space 48 with the plunger 2 side of the pressurizing chamber 11. Hereinafter, the area of a plane in the gap 61*b* which is orthogonal to the center line of the second chamber 1*b* will be referred to as an "opening area of the gap 61*b*".

The opening area of the gap 61*b* is set to be larger than the opening area of the gap 61*a*. Increasing the opening area reduces the pressure loss. Further, a pressure change is more preferentially generated at a portion which causes a smaller pressure loss than at a portion which causes a larger pressure loss. Namely, a pressure change is more preferentially generated in the gap 61*b* than in the gap 61*a*.

As a result, cavitation can be preferentially generated in the space 48. Therefore, according to the present embodiment, cavitation erosion can be preferentially generated in any portion 45*x* of the annular groove portion 45. The opening area of the gap 61*b* is preferably set to, for example, 1.25 times or more the opening area of the gap 61*a*.

Further, the volume of the space 48 formed by the annular groove portion 45 is larger than the volume of the space 47 generated near the valve contact portion 44*b*. This can disperse the positions of occurrences of cavitation in the space 48. As a result, it is possible to prevent cavitation from occurring and collapsing repeatedly at the same position, thereby reducing the number of occurrences of cavitation erosion in the annular groove portion 45.

The gap 61*b* is set to have such a size as not to pass, therethrough, foreign substances peeled off from the annular groove portion 45 due to cavitation erosion. Namely, the gap 61*b* may be preferably determined according to the sizes of foreign substances which are not desired to flow from the space 48 to the plunger 2 side of the pressurizing chamber 11.

Even if a foreign substance with a size of 0.2 mm or less is bitten by the relief valve 43, this exerts a small influence on the seat performance. Therefore, the gap 61*b* is preferably set to, for example, 0.2 mm or less. This can prevent foreign substances with sizes larger than 0.2 mm from flowing into the plunger 2 side of the pressurizing chamber 11. As a result, it is possible to suppress the deterioration of the seat performance of the relief valve 43, thereby improving the quality of the high-pressure fuel supply pump 100.

Here, in the direction orthogonal to the center line of the second chamber 1*b* (in the direction of movement of the relief valve 43), the distance from the second chamber 1*b* (the pump body 1) to the valve contact portion 44*b* is defined as a distance 62*a*. Further, in the direction parallel to the center line of the second chamber 1*b*, the distance from the end surface of the flange portion 46 of the seat member 44 to the end portion of the annular groove portion 45 opposite to the flange portion 46 is defined as a distance 62*b*.

Descending of the plunger 2 depressurizes the fuel in the pressurizing chamber 11. The depressurization of the fuel starts from the deepest portion farthest from the plunger 2 in the pressurizing chamber 11. Therefore, the distance 62*b* is set to be larger than the distance 62*a*. Consequently, the fuel in the space 48 formed by the annular groove portion 45 starts to be depressurized earlier than the fuel in the space 47. As a result, cavitation can be actively generated in the space 48.

In the present embodiment, the relief valve mechanism 4 is disposed at a position farthest from the plunger 2 in the pressurizing chamber 11. Therefore, cavitation occurs in the relief valve mechanism 4. However, when the suction valve mechanism or the discharge valve mechanism is disposed at a position farthest from the plunger in the pressurizing chamber, cavitation occurs in the suction valve mechanism or the discharge valve mechanism.

In this case, a space similar to the space 48 according to the present embodiment may be provided in the suction valve mechanism or the discharge valve mechanism.

2. Conclusion

As described above, the high-pressure fuel supply pump 100 (the fuel pump) according to the aforementioned embodiment includes the plunger 2 adapted to reciprocate, the pressurizing chamber 11 adapted to increase and decrease its volumetric capacity through the reciprocation of the plunger 2, and the relief valve mechanism 4 adapted to return a fuel to the pressurizing chamber 11. The relief valve mechanism 4 includes the relief valve 43, and the seat member 44 having the valve contact portion 44*b* for seating the relief valve 43 thereon. The relief valve 43 is disposed closer to the plunger 2 than the seat member 44. The seat member 44 has the annular groove portion 45 which forms the space 48 communicating with the pressurizing chamber 11, between the annular groove portion and the second chamber 1*b* (a fixing portion) surrounding the outer peripheral surface of the seat member 44. The space 48 is provided at a position farther from the plunger 2 than the valve contact portion 44*b*. Consequently, cavitation can be preferentially generated in the space 48. This can prevent the occurrence of cavitation in the space 47 near the valve contact portion 44*b*.

In the high-pressure fuel supply pump 100 (the fuel pump) according to the aforementioned embodiment, the relief valve mechanism 4 includes the relief valve holder 42 for holding the relief valve 43. Further, in the relief valve mechanism 4, there is formed the space 47 (a valve-contact-portion side space) surrounded by the relief valve 43, the relief valve holder 42, and the seat member 44. The area of the opening which communicates the space 48 and the plunger 2 side of the pressurizing chamber 11 with each other (the opening area of the gap 61*b*) is larger than the area of the opening which communicates the space 47 and the plunger 2 side of the pressurizing chamber 11 with each other (the opening area of the gap 61*a*). Therefore, a pressure change is more preferentially generated in the opening which communicates the space 48 and the plunger 2 side of the pressurizing chamber 11 with each other (the gap 61*b*) than in the opening which communicates the space 47 and the plunger 2 side of the pressurizing chamber 11 with each other (the gap 61*a*). As a result, cavitation can be generated in the space 48 rather than in the space 47.

Further, in the relief valve mechanism 4 according to the aforementioned embodiment, the volumetric capacity of the space 48 is larger than the volumetric capacity of the space 47 (the valve-contact-portion side space). This can disperse the positions of occurrences of cavitation in the space 48, which can prevent cavitation from occurring and collapsing repeatedly at the same position in the space 48. As a result, it is possible to reduce the number of occurrences of cavitation erosion in the annular groove portion 45.

Further, in the relief valve mechanism 4 according to the aforementioned embodiment, the seat member 44 includes the flange portion 46 facing the relief valve holder 42. The flange portion 46 forms an opening which communicates the space 48 and the plunger 2 side of the pressurizing chamber 11 with each other. By providing the flange portion 46, it is possible to reduce the volumetric capacity of the pressurizing chamber 11, even though the annular groove portion 45 is provided. This can suppress the decrease of the discharging efficiency.

Further, according to the aforementioned embodiment, the gap between the outer peripheral surface 46*a* of the flange portion 46 and the second chamber 1*b* (the fixing portion) is 0.2 mm or less. This can prevent foreign substances with sizes larger than 0.2 mm from flowing into the plunger 2 side of the pressurizing chamber 11. As a result, it is possible to suppress the deterioration of the seat performance of the relief valve 43, thereby improving the quality of the high-pressure fuel supply pump 100.

Further, according to the aforementioned embodiment, the distance (the distance 62*b*) from the end surface of the seat member 44 which faces the relief valve holder 42 (the end surface of the flange portion 46) to the end portion of the annular groove portion 45 opposite to the relief valve holder 42 in the direction of movement of the relief valve 43 is larger than the distance (the distance 62 *a*) from the second chamber 1*b* (the fixing portion) to the valve contact portion 44*b* in the direction orthogonal to the direction of movement of the relief valve 43. Consequently, the fuel in the space 48 formed by the annular groove portion 45 starts to be depressurized earlier than the fuel in the space 47. As a result, cavitation can be actively generated in the space 48.

Further, in the relief valve mechanism 4 according to the aforementioned embodiment, the seat member 44 is secured to the second chamber 1*b* in the pump body 1. This can reduce the number of components, as compared with a case of providing a housing integrally incorporating the seat member and the relief valve.

Also, the relief valve mechanism 4 according to the aforementioned embodiment may be provided with a housing which integrally incorporates the relief spring, the relief valve holder, the relief valve, and the seat member. In this case, the relief valve mechanism as one assembled component is secured to the body of the high-pressure fuel supply pump. Further, in this case, a space for preferentially generating cavitation therein is formed between the housing and the seat member. This can facilitate works for assembling the relief valve mechanism.

There has been described an embodiment of the fuel pump according to the present invention, including effects and advantages thereof. However, the fuel pump according to the present invention is not limited to the aforementioned embodiment, and various modifications can be made without departing from the gist of the invention described in the claims. In addition, the aforementioned embodiment has been described in detail, for the purpose of explaining the present invention in such a way as to facilitate understanding the present invention, and the present invention is not necessarily limited to the structure including all the described structures.

REFERENCE SIGNS LIST

1 pump body
1*a* first chamber
1*b* second chamber
1*c* third chamber
1*d* suction path
1*e* communication hole
1*x* fixing portion
2 plunger
3 electromagnetic suction valve mechanism
4 relief valve mechanism
5 suction joint
6 cylinder
8 discharge valve mechanism
9 pressure pulsation reduction mechanism
10 low-pressure fuel chamber
11 pressurizing chamber
12 discharge joint
15 retainer
17 seal holder
17*a* auxiliary chamber
18 plunger seal
30 suction valve chamber
42 relief valve holder
43 relief valve
44 seat member
44*a* fuel path
44*b* valve contact portion
45 annular groove portion
46 flange portion
46*a* outer peripheral surface
47, 48 space
51 low-pressure fuel suction port
52 suction flow path
53 suction filter
61*a*, 61*b* gap
62*a*, 62*b* distance
100 high-pressure fuel supply pump
101 ECU
102 feed pump
103 fuel tank
104 low-pressure pipe
105 fuel pressure sensor
106 common rail
107 injector

The invention claimed is:

1. A fuel pump comprising:
a plunger adapted to reciprocate;
a pressurizing chamber adapted to increase and decrease its volumetric capacity through the reciprocation of the plunger;
a second chamber; and
a relief valve mechanism adapted to return a fuel to the pressurizing chamber,
wherein
the relief valve mechanism includes
a holder;
a relief valve, and
a seat member having a valve contact portion for seating the relief valve thereon,
the relief valve is disposed closer to the plunger than the seat member,
the seat member includes an annular groove portion which forms a space communicating with the pressurizing chamber between the annular groove portion and a fixing portion surrounding an outer peripheral surface of the seat member,
the space is provided at a position farther from the plunger than the valve contact portion,
a first gap is formed between a flange portion of the seat member and the holder of the relief valve,
an opening area of a peripheral surface of the first gap which faces the second chamber communicates a space generated near a valve contact portion with a plunger side of the pressurizing chamber,
a second gap is formed between an outer peripheral surface of the flange portion and an inner peripheral surface of the second chamber, an opening area of a plane in the second gap which is orthogonal to a center line of the second chamber communicates a second space with a plunger side of the pressurizing chamber, the opening area of the second gap is 1.25 times larger than an opening area of the first gap, and a size of the opening area of the first gap is 0.16 mm or less.

2. The fuel pump according to claim 1, wherein the relief valve mechanism includes a relief valve holder for holding the relief valve, there is formed a valve-contact-portion side space surrounded by the relief valve, the relief valve holder, and the seat member, and an area of an opening communicating the space and a plunger side of the pressurizing chamber with each other is larger than an area of an opening communicating the valve-contact-portion side space and the plunger side of the pressurizing chamber with each other.

3. The fuel pump according to claim 2, wherein a volume of the space is larger than a volume of the valve-contact-portion-side space.

4. The fuel pump according to claim 2, wherein the seat member includes a flange portion facing the relief valve holder, and the flange portion forms an opening which communicates the space and the plunger side of the pressurizing chamber with each other.

5. The fuel pump according to claim 4, wherein a gap between an outer peripheral surface of the flange portion and the fixing portion is 0.2 mm or less.

6. The fuel pump according to claim 2, wherein a distance from an end surface of the seat member which faces the relief valve holder to an end portion of the annular groove portion opposite to the relief valve holder in a direction of movement of the relief valve is larger than a distance from the fixing portion to the valve contact portion in a direction orthogonal to the direction of movement of the relief valve.

7. The fuel pump according to claim 1, wherein the fixing portion comprises a body adapted to insert the plunger therein.

8. The fuel pump according to claim 1, wherein the relief valve mechanism includes a housing adapted to integrally incorporate the relief valve and the seat member, and the fixing portion comprises the housing.

9. A fuel pump comprising:

a plunger adapted to reciprocate;

a pressurizing chamber adapted to increase and decrease its volumetric capacity through the reciprocation of the plunger;

a second chamber, and a valve mechanism adapted to communicate with the pressurizing chamber, wherein the valve mechanism includes a holder a valve, and a seat member having a valve contact portion for seating the valve thereon, the valve is disposed closer to the plunger than the seat member, the seat member includes an annular groove portion which forms a space communicating with the pressurizing chamber between the annular groove portion and a fixing portion surrounding an outer peripheral surface of the seat member, the space is provided at a position farther from the plunger than the valve contact portion, a first gap is formed between a flange portion of the seat member and the holder of the relief valve, an opening area of a peripheral surface of the first gap which faces the second chamber communicates a space generated near a valve contact portion with a plunger side of the pressurizing chamber, a second gap is formed between an outer peripheral surface of the flange portion and an inner peripheral surface of the second chamber, an opening area of a plane in the second gap which is orthogonal to a center line of the second chamber communicates a second space with a plunger side of the pressurizing chamber, the opening area of the second gap is 1.25 times larger than an opening area of the first gap, and a size of the opening area of the first gap is 0.16 mm or less.

* * * * *